United States Patent [19]

Savinsky

[11] Patent Number: 5,765,415
[45] Date of Patent: Jun. 16, 1998

[54] ANTI-THEFT DEVICE FOR VEHICLES

[76] Inventor: Stanislav Savinsky, 12-59 George St., Fairlawn, N.J. 07410

[21] Appl. No.: 827,178

[22] Filed: Mar. 27, 1997

[51] Int. Cl.$^6$ ................................................ B60R 25/02
[52] U.S. Cl. ................................................ 70/209; 70/226
[58] Field of Search ........................... 70/207, 209, 211, 70/212, 225, 226, 227, 237, 238

[56] References Cited

U.S. PATENT DOCUMENTS

| | | | |
|---|---|---|---|
| 4,103,524 | 8/1978 | Mitchell et al. | 70/237 X |
| 4,974,433 | 12/1990 | Wang | 70/237 X |
| 5,199,284 | 4/1993 | Lin | 70/238 X |
| 5,257,518 | 11/1993 | Hsieh | 70/238 X |
| 5,297,406 | 3/1994 | Lin | 70/238 X |
| 5,363,679 | 11/1994 | Prasad | 70/238 X |
| 5,381,679 | 1/1995 | Cummins | 70/238 X |
| 5,460,021 | 10/1995 | Taylor | 70/238 X |
| 5,636,538 | 6/1997 | Openiano | 70/226 X |

*Primary Examiner*—Lloyd A. Gall
*Attorney, Agent, or Firm*—Ilya Zborovsky

[57] ABSTRACT

An anti-theft device has a first elongated element formed to be arranged on top of a steering wheel and having a first forked end formed to receive one portion of a steering wheel rim between an upper prong and a lower prong of the first end, the first elongated element also having a second end, a second elongated element having a first end which is distal from the first elongated element and provided with a lock, the second elongated element also having a second forked end arranged to at least partially surround a diametrical opposite part of the steering wheel rim and also to surround a steering wheel spoke at both circumferential ends, and snapping structure formed in the second ends of the first and second elongated elements, the second elongated element being turnable relative to the first elongated element between a locking position in which the first and second elongated elements are in alignment with one another and the locking structure of the second ends snappingly lock one another and the device can not be removed from the steering wheel, and an unlocking position in which the second elongated element is turned at an angle relative to the first elongated element and the second end of the second elongated element is withdrawn from the diametrically opposite part of the steering wheel rim so that the device can be removed from the steering wheel.

9 Claims, 5 Drawing Sheets

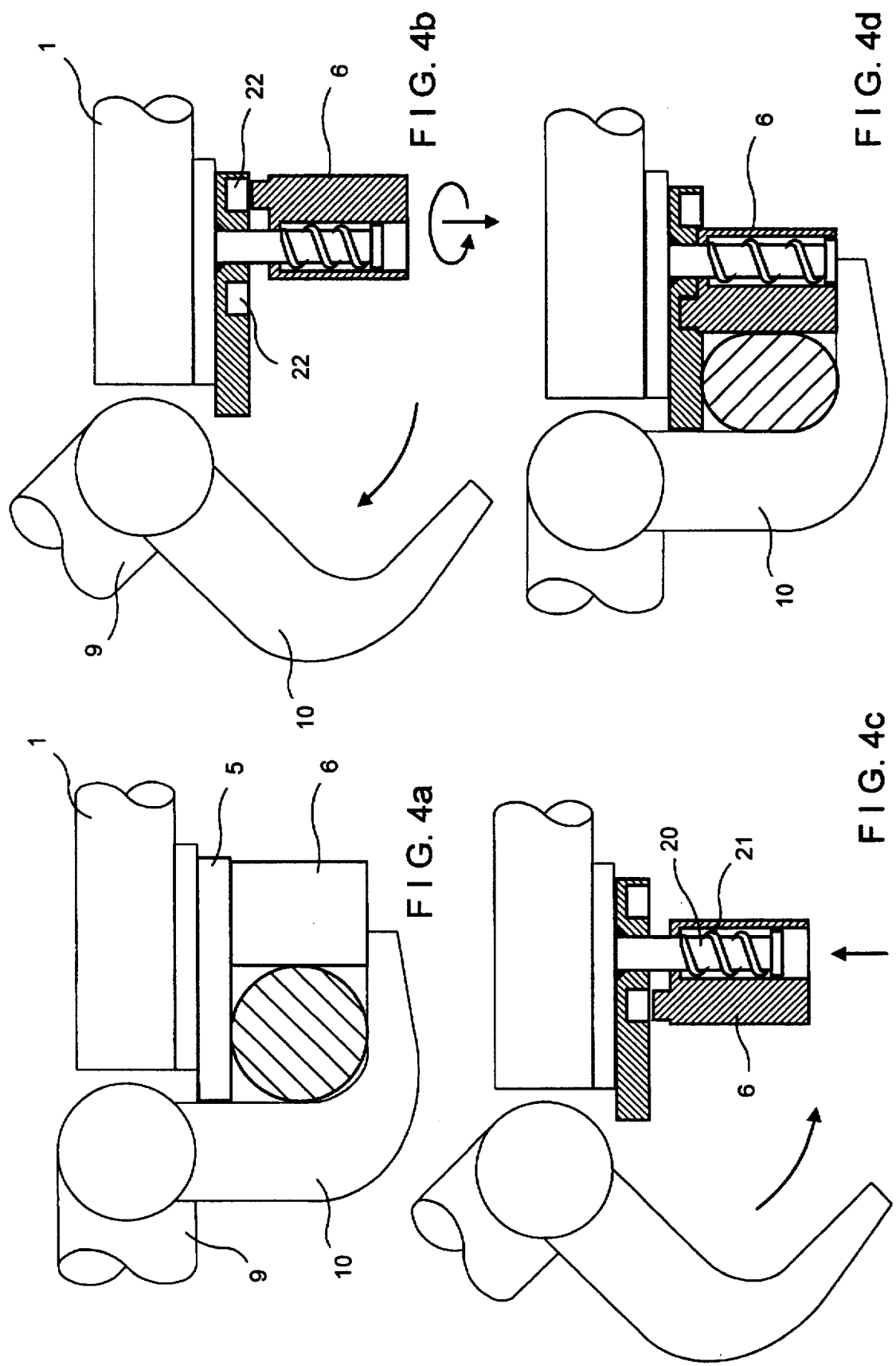

ANTI-THEFT DEVICE FOR VEHICLES

BACKGROUND OF THE INVENTION

The present invention relates to an anti-theft for vehicles.

Anti-theft devices are known and used in many modifications. Some of the anti-theft devices are designed to lock a steering wheel and to prevent its turning. It is believed that it is advisable to provide further modifications and improvements of such anti-theft devices.

SUMMARY OF THE INVENTION

Accordingly, it is an object of the present invention to provide an anti-theft device which prevents turning of a steering wheel of the vehicle.

In keeping with these objects and with others which will become apparent hereinafter, one feature of the present invention resides, briefly stated, in anti-theft device which has a first elongated element formed to be arranged on top of a steering wheel and having a first forked end formed to receive one portion of a steering wheel rim between an upper prong and a lower prong of said first end, said first elongated element also having a second end; a second elongated element having a first end which is distal from said first elongated element and provided with a lock, said second elongated element also having a second forked end arranged to at least partially surround a diametrical opposite part of the steering wheel rim and also to surround a steering wheel spoke at both circumferential ends; and snapping means formed in said second ends of said first and second elongated elements, said second elongated element being turnable relative to said first elongated element between a locking position in which said first and second elongated elements are in alignment with one another and said locking means of said second ends snappingly lock one another and the device can not be removed from the steering wheel, and an unlocking position in which said second elongated element is turned at an angle relative to said first elongated element and said second end of said second elongated element is withdrawn from the diametrically opposite part of the steering wheel rim so that the device can be removed from the steering wheel, said locking means releasing said snapping means from one another to allow turning said second elongated element relative to said first elongated element from said locked position to said unlocked position.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 4a, 4b, 4c and 4d are views showing adjustable abutments of the inventive device.

DESCRIPTION OF PREFERRED EMBODIMENTS

Figure 1A:
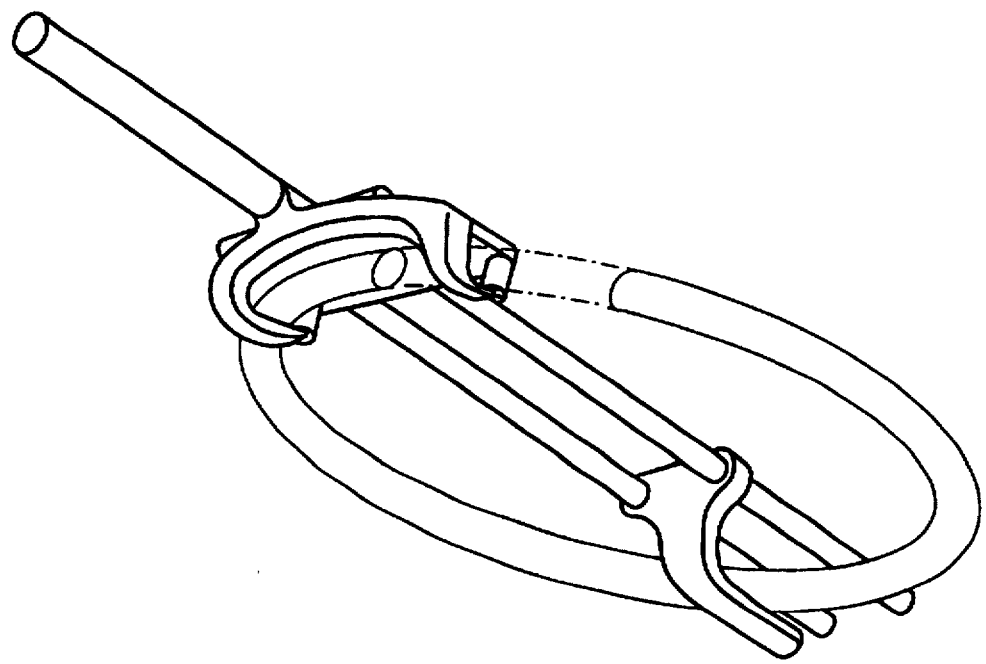
FIGS. 1a and 1b are two perspective views of the inventive anti-theft device from different points of view.
Figure 1B:
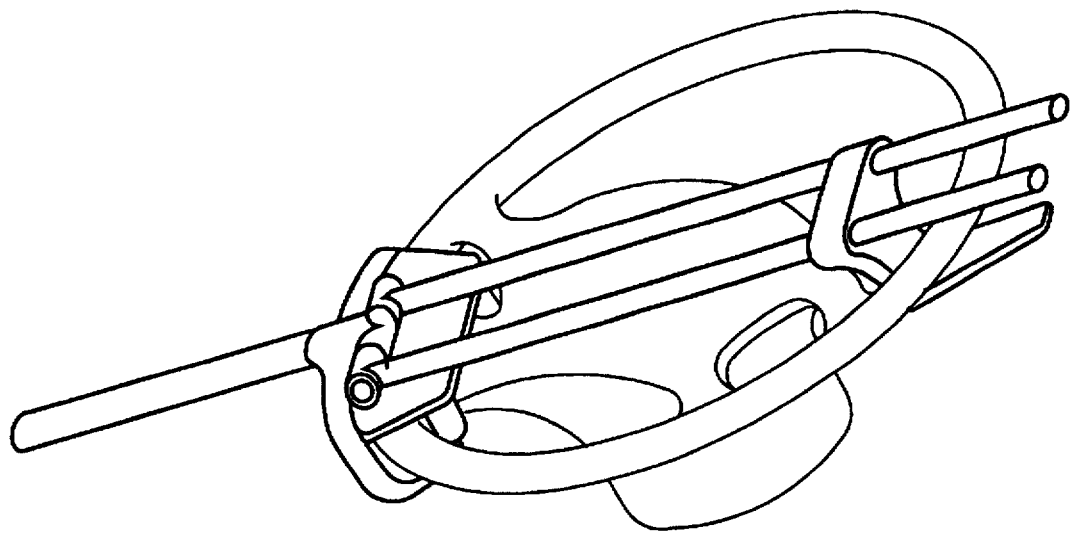
Figure 2A:
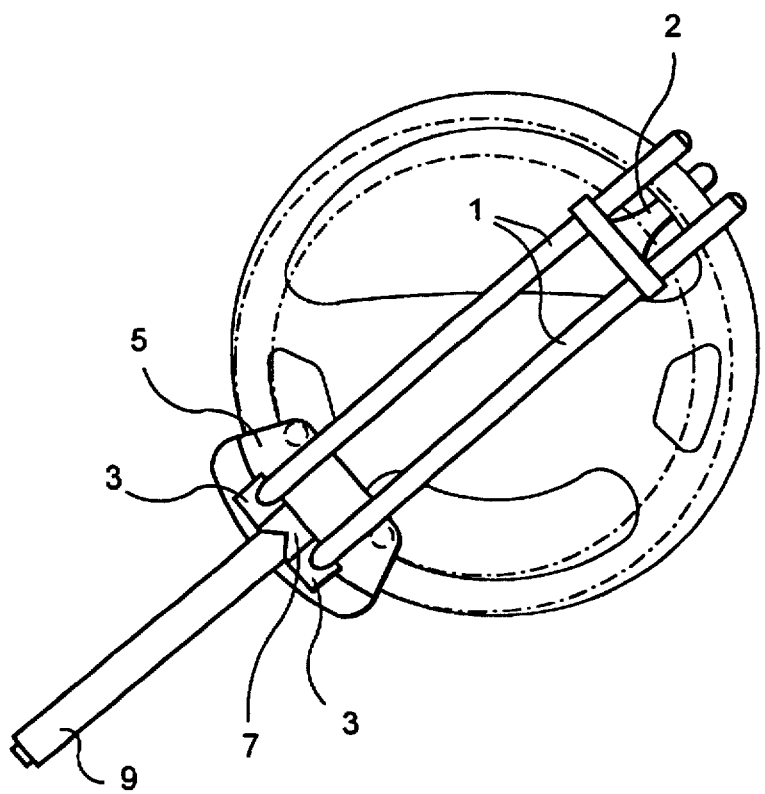
FIGS. 2a and 2b are a plan view and a side view of an anti-theft device in accordance with the present invention.
Figure 2B:
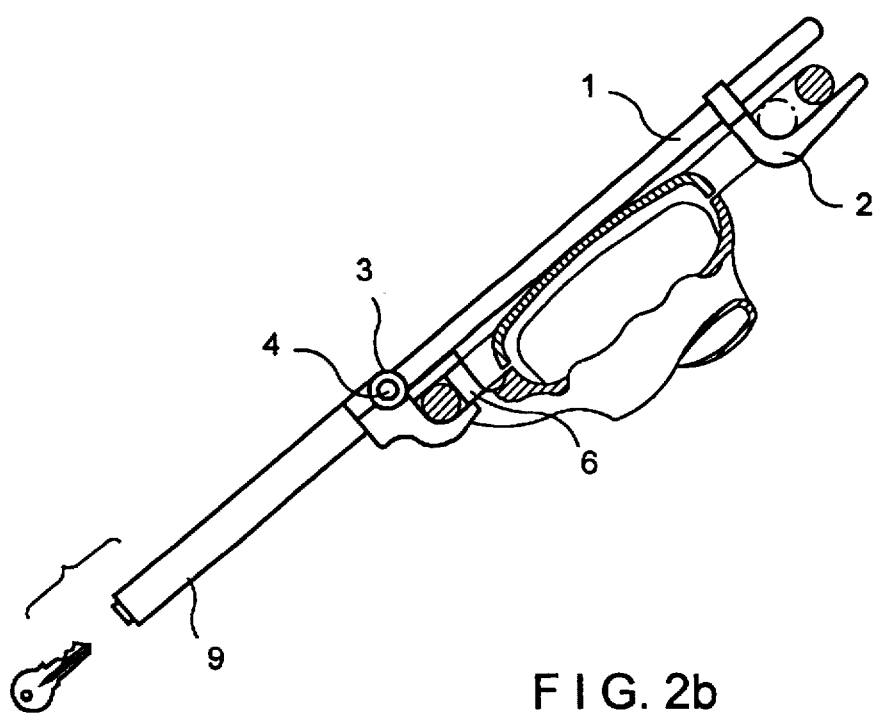
Figure 3A:
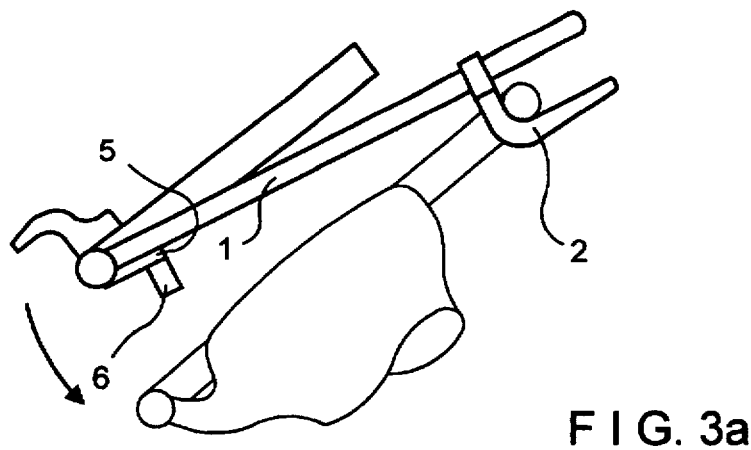
FIGS. 3a, 3b, and 3c are views schematically showing three different positions of the inventive anti-theft device.
Figure 3B:
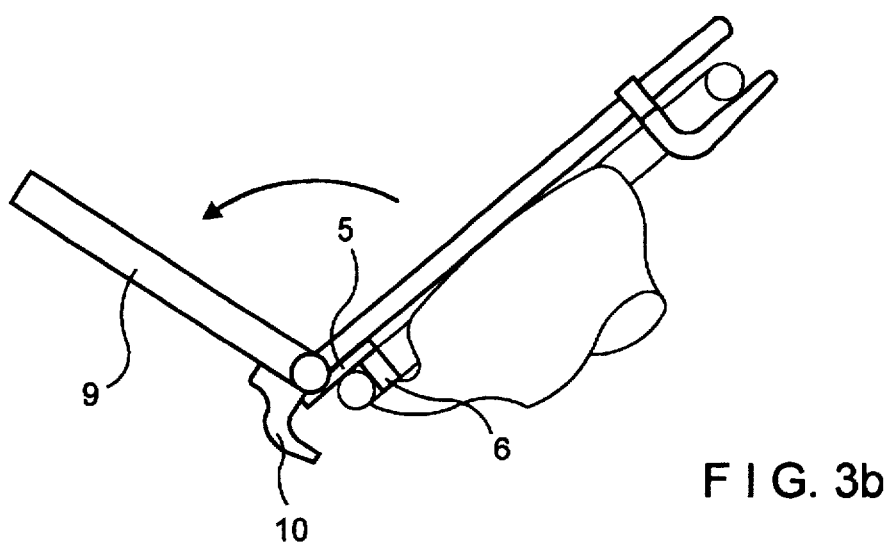
Figure 3C:
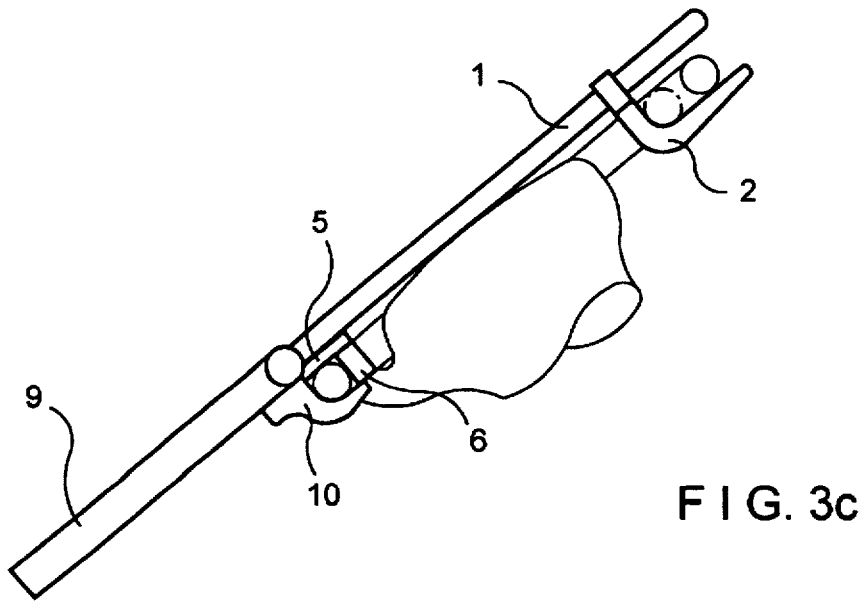

An anti-theft device in accordance with the present invention has a first elongated element identified as a whole with reference numeral 1. The first elongated element 1 is composed of two tubes extending parallel to one another and is provided on its first end with a hook-shaped structure 2. In particular, the hook-shaped structure has two extended end portions of the two pipes to be located on top of a steering wheel rim, and a lower projection extending from a transverse plate through which the two tubes pass and arranged to be located under the vehicle wheel rim, so that one portion of the vehicle wheel rim is surrounded by the three projections or in other words received inside the hook-shaped structure. The hook-shaped structure can surround the one vehicle wheel hub portion of both a standard vehicle wheel and a sport vehicle wheel shown in a broken line in FIGS. 2a, 2b. The opposite second end of the first elongated element 1 is connected to a snapping unit which includes a hinge formed by two ears 3 with a rod-shaped axle 4 inside the ears. The ears 3 with the rod 4 are connected to a plate 5 provided with adjustable abutments 6. A medium part of the hinge has an ear 7 with a bushing 8 as shown in FIGS. 2a–5c.

The device is applied onto the steering wheel by engaging the hook-shaped structure 2 around the part of the vehicle wheel hub, and then the elongated element 1 is placed over the vehicle wheel so that the plate 5 is placed onto the rim at the location where a spoke is attached to the rim, while the abutments 6 extend vertically through the plane of the vehicle wheel at both circumferential sides of the spoke as shown in FIGS. 1a–4c. The device has a second elongated element 9 provided with hooks 10 which is hingedly turnable relative to the first elongated element 1 to a locking position in which the elements 1 and 9 are in alignment with one another. In this position the hooks 10 surrounds the diametrically opposite part of the vehicle wheel hub radially outwardly and from below as shown for example in FIG. 3c, so that the vehicle wheel rim at this side and the spoke are firmly surrounded by the plate 5, the abutments 6, and the hooks 10. In this position the airbag compartment is reliably covered by the device to prevent stealing of an airbag, the plate prevents sawing of the steering wheel rim in the region of the spoke, the spoke is connected with the device, and the device is composed of a sawing-resistant material. In this position the elongated elements 1 and 9 are snapped with one another as will be explained herein below.

The first distal end of the elongated element 9 is provided with a lock 11 having a latch 12 engageable into an opening 13. A spring 14 urges a rod 15 connected with a snapping bolt 16 in direction toward the lock 11 and away from an axle 4 of the elongated element 1. The rod 15 has a bushing 18 in which the snapping pin 16 passes, and a spring 19 biases the snapping pin 16 toward the axle 4. In the operative position shown in FIG. 5c, the snapping rod 16 engages in the groove 17 of the axle 4, and the elongated elements 1 and 9 are connected with one another by snapping in the aligned position so that the device is reliably held in the working position. In order to remove the device the lock 11 is turned by the key so that the latch 12 is withdrawn from the opening 13. The spring 14 of the rod 15 pushes the lock 11 and the rod 15 connected with it, as well as the snapping pin 16 so that the snapping pin is withdrawn from the groove 17 of the axle 4. The system is opened, and the elongated element 9 can be turned relative to the elongated element 1 to the position shown for example in FIG. 3 and 5b so as to remove the anti-theft device from the vehicle wheel. In order to bring this anti-theft back into the working position it is enough to push the lock 11 as a push button. The latch 12 engages in the opening 13, the rod 15 with the bushing 18 which receives the snapping rod 16 compresses the spring 14 of the rod 15 and the spring 19 of the snapping rod 16 and moves toward the axle 4. The snapping rod 16 abuts against the axle 4. The anti-theft device is therefore armed or ready for locking. When the elongated element 9 further turns in direction of the arrow shown in FIG. 5b, and finally the elongated element 9 is brought in alignment with the elongated element 1, the snapping pin 16 under the direction of the spring 19 snaps into the groove 17. The anti-blocking device is reliably held on the vehicle wheel.

Figure 5A:
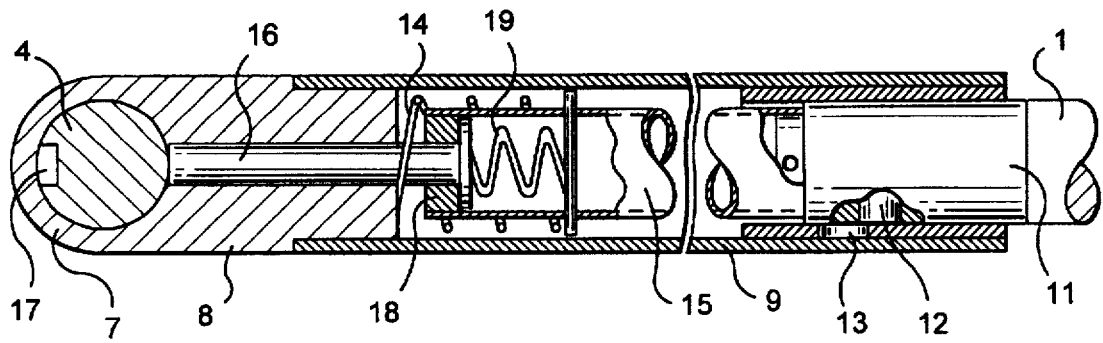
FIGS. 5a, 5b, 5c are views showing a cross-section of a connecting area between elongated elements of inventive anti-theft device in three different positions.
Figure 5B:
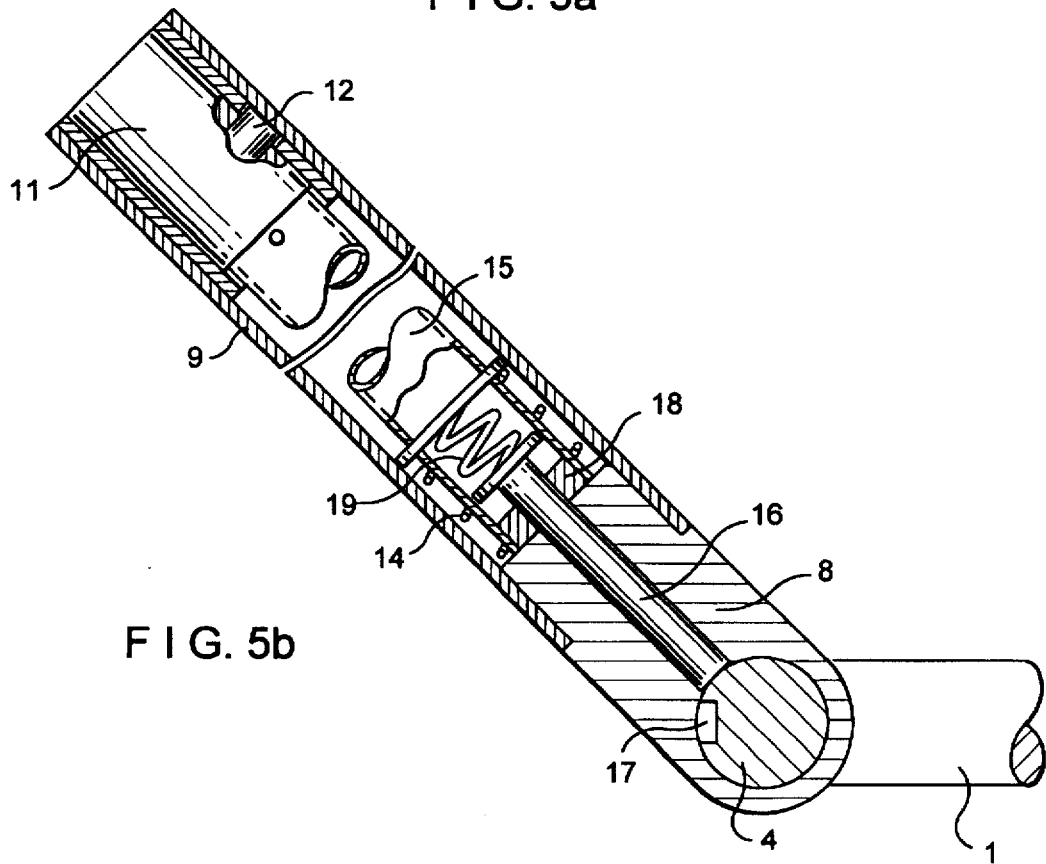
Figure 5C:
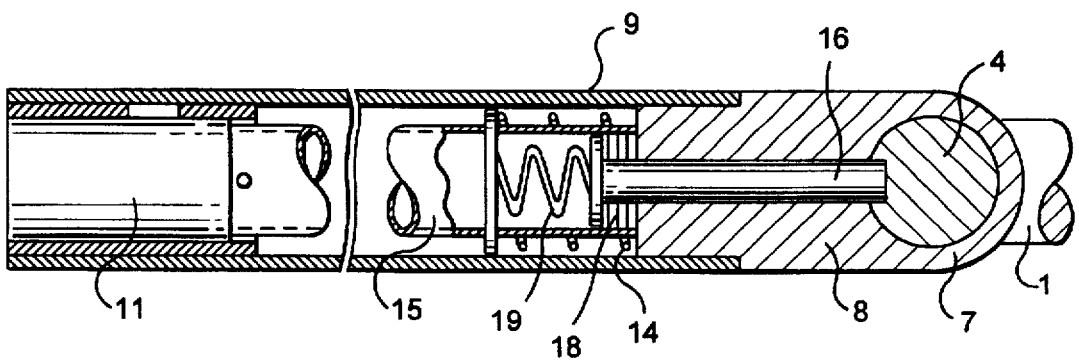

Therefore in the position "disarmed" the lock 11 is unlocked by the key, the element 12 is disengaged from the opening 13, the spring 14 abuts with its one end against the bushing 8 and with its another end against the rod 15, with the lock 11 connected to its one end and the bushing 18 connected to its other end, the bushing in turn withdraws rod 16 which abuts with its head against the edge of the bushing 18, from the groove 17. In this position the device is unlocked and the elongated element 9 can freely turn around a hinge so as to release the rim. In the position "armed" the device is activated in any position, with the exception of the position "Locked". In the position which is opposite to the position "Locked", or in other words, when the device is completely folded, the state "armed" is obtained automatically since in this position the lock 11 extending beyond the pipe 9 and forming a button which is spring-biased by the spring 14, abuts against the part of the fork 2 and extends into the pipe so as to compress the spring 14 until the latch engages in the opening 13. In intermediate positions, the depression of the button is performed by finger during turning of the elongated element 9 around the hinge, which is also very convenient. The lock 11 through the rod 15 connected to it and having a pin extending through it, compresses the spring 14 by abutting against it with the pin, while the other end abuts against the end of the bushing 8. The rod 16 abuts with its one end against the axle 4 and compresses with its another end the spring 19 which abuts with its opposite end against the same pin. In this position, the device is armed and ready to snap the rod 16 in the groove 17 when the device is completely closed and the axes of both elements are in one line as shown in FIG. 5c. This is the "Locked" position. The locked position can be obtained also without the use of the armed position, by a simple pressing with a finger of the button-lock 11 when the device obtains the position "Locked". With this method of closing, the lock part of the device can be simplified. The bushing 18 with the spring 19 is no longer needed, and the locking rod can be formed of one piece with the rod 15.

The hooks 10 retain the vehicle wheel spoke between the plate 5 and the abutments 6. In order to more tightly surround the vehicle wheel rim the abutment 6 are adjustable to provide a possibility of embracing both of a thick rim and a thin rim. A body of the abutment is arranged on an axle 20 and spring-biased by a spring 21 so that a projection of the abutment 6 can be introduced into one of recesses 22 of the plate 5. This can be done only in the open condition by pulling and turning the body of the abutment 6 to a desired position as shown in the drawings. After the locking, the abutments are blocked by the hooks 10 and they can not be lifted. In a folded transporting position shown in for example in FIG. 3a, the anti-theft device is substantially smaller than other anti-theft devices, while in the working position it is substantially longer and its protective features and the protection rendered by it is substantially greater than the protection rendered by known systems.

It will be understood that each of the elements described above, or two or more together, may also find a useful application in other types of constructions differing from the types described above.

While the invention has been illustrated and described as embodied in an anti-theft device for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An anti-theft device, comprising a first elongated element formed to be arranged on top of a hub of a steering wheel and having a first forked end formed to receive one portion of a steering wheel rim between an upper prong and a lower prong of said first forked end, said first elongated element also having a second end; a second elongated element having a first end which is distal from said first elongated element and provided with a lock, said second elongated element also having a second forked end arranged to at least partially surround a diametrical opposite part of the steering wheel rim and also to surround a steering wheel spoke at both circumferential ends; and snapping locking means formed in said second ends of said first and second elongated elements, said second elongated element being turnable relative to said first elongated element between a locking position in which said first and second elongated elements are in alignment with one another and said locking means of said second ends snappingly lock one another and the device can not be removed from the steering wheel, and an unlocking position in which said second elongated element is turned at an angle relative to said first elongated element and said second end of said second elongated element is withdrawn from the diametrically opposite part of the steering wheel rim so that the device can be removed from the steering wheel, said lock releasing said snapping locking means from one another to allow turning said second elongated element relative to said first elongated element from said locking position to said unlocking position.

2. An anti-theft device as defined in claim 1, wherein said first end of said first elongated element has one lower prong and at least one upper prong spaced from said lower prong so as to receive the one portion of the steering wheel rim therebetween.

3. An anti-theft device as defined in claim 2, wherein said first elongated element has two elongated members spaced from one another and forming two upper projections.

4. An anti-theft device as defined in claim 1, including an upper plate and a lower hook arranged so that the diametrically opposite part of the steering wheel rim can be received between said plate and said hook.

5. An anti-theft device as defined in claim 4, and further comprising means for hingedly connecting said second ends of said elongated elements with one another including a hinge pin and at least one hinge loop connected with said upper plate.

6. An anti-theft device as defined in claim 1, wherein said second end of said second elongated element has a lower hook surrounding the opposite part of the steering wheel rim radially outwardly and downwardly, said second end of said first elongated element having an abutment surrounding the opposite part of the steering wheel rim radially inwardly.

7. An anti-theft device as defined in claim 6, wherein said abutment is adjustable.

8. An anti-theft device as defined in claim 1, wherein said second end of said first elongated element has a snapping groove, said second elongated element having a movable member located inside said second elongated element and snappable into said groove when said elongated elements are in alignment with one another.

9. An anti-theft device as defined in claim 8; and further comprising spring means formed to act on said member so as to urge it from said groove.

* * * * *